US009801066B1

(12) United States Patent
Hanley et al.

(10) Patent No.: US 9,801,066 B1
(45) Date of Patent: Oct. 24, 2017

(54) METHOD FOR AUTOMATIC POSSESSION-FACTOR AUTHENTICATION

(71) Applicant: Duo Security, Inc., Ann Arbor, MI (US)

(72) Inventors: Michael Hanley, Ann Arbor, MI (US); Jon Oberheide, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/586,148

(22) Filed: May 3, 2017

Related U.S. Application Data

(60) Provisional application No. 62/344,512, filed on Jun. 2, 2016.

(51) Int. Cl.
*H04W 12/06* (2009.01)
*G06F 17/30* (2006.01)
*H04L 29/06* (2006.01)
*G07C 9/00* (2006.01)
*H04W 12/08* (2009.01)
*G06N 7/00* (2006.01)
*G06Q 20/10* (2012.01)

(52) U.S. Cl.
CPC ...... *H04W 12/06* (2013.01); *G06F 17/30864* (2013.01); *G06N 7/005* (2013.01); *G06Q 20/1085* (2013.01); *G07C 9/00134* (2013.01); *H04L 63/0838* (2013.01); *H04L 63/107* (2013.01); *H04W 12/08* (2013.01)

(58) Field of Classification Search
CPC . H04W 12/06; H04W 12/08; G06F 17/30864; H04L 63/0838; H04L 63/107; G07C 9/00134; G06N 7/005; G06Q 20/1085
See application file for complete search history.

(56) References Cited

U.S. PATENT DOCUMENTS

| 8,868,902 | B1 * | 10/2014 | Brown | G06Q 20/322 713/155 |
|---|---|---|---|---|
| 9,264,419 | B1 * | 2/2016 | Johansson | H04L 63/08 |
| 9,554,274 | B1 * | 1/2017 | Castinado | H04W 12/06 |
| 2005/0144449 | A1 * | 6/2005 | Voice | G06F 21/34 713/169 |
| 2005/0268107 | A1 * | 12/2005 | Harris | G06F 21/31 713/182 |

(Continued)

*Primary Examiner* — Darren B Schwartz
(74) *Attorney, Agent, or Firm* — Jeffrey Schox; Padowithz Alce

(57) ABSTRACT

Systems and methods are provided that include: accessing implicit authentication data from a possession factor associated with an authorized user; at the possession factor or at an authentication platform: generating a possession confidence level using the implicit authentication data, the possession confidence level being one of a plurality of possession confidence levels, the possession confidence level indicating a likelihood that the possession factor is possessed by the authorized user; identifying, among a plurality of varying authentication requirements, an authentication requirement for the transaction based on the possession confidence level, the authentication requirement defines a process or action to prove authority to perform the transaction or a process or action to prove an identity of a user attempting to perform the transaction; and implementing the authentication requirement for the transaction.

20 Claims, 4 Drawing Sheets

(56) References Cited

U.S. PATENT DOCUMENTS

| | | | | |
|---|---|---|---|---|
| 2008/0141353 A1* | 6/2008 | Brown | G10L 13/00 | 726/7 |
| 2009/0113543 A1* | 4/2009 | Adams | G06F 21/33 | 726/18 |
| 2009/0165125 A1* | 6/2009 | Brown | G06F 21/31 | 726/21 |
| 2009/0287921 A1* | 11/2009 | Zhu | G06Q 10/02 | 713/155 |
| 2012/0106805 A1* | 5/2012 | Shuster | G06K 9/00228 | 382/115 |
| 2012/0144461 A1* | 6/2012 | Rathbun | H04L 9/3213 | 726/5 |
| 2012/0311320 A1* | 12/2012 | Brown | G06Q 20/3274 | 713/155 |
| 2013/0024932 A1* | 1/2013 | Toebes | G06F 21/31 | 726/19 |
| 2013/0347071 A1* | 12/2013 | Polo Moragon | H04L 63/0853 | 726/3 |
| 2014/0082715 A1* | 3/2014 | Grajek | H04L 63/0815 | 726/8 |
| 2014/0157381 A1* | 6/2014 | Disraeli | G06F 21/31 | 726/7 |
| 2014/0266601 A1* | 9/2014 | Narendra | G06F 21/32 | 340/5.83 |
| 2014/0282893 A1* | 9/2014 | Sheller | H04L 63/08 | 726/4 |
| 2014/0289808 A1* | 9/2014 | Blanke | G06Q 20/42 | 726/4 |
| 2014/0289833 A1* | 9/2014 | Briceno | H04L 63/08 | 726/7 |
| 2014/0359744 A1* | 12/2014 | Hillis | H04L 63/0853 | 726/9 |
| 2014/0366111 A1* | 12/2014 | Sheller | H04L 63/08 | 726/7 |
| 2014/0372762 A1* | 12/2014 | Flautner | H04L 9/3226 | 713/173 |
| 2015/0074800 A1* | 3/2015 | Farraro | G06F 21/35 | 726/20 |
| 2015/0227731 A1* | 8/2015 | Grigg | G06F 21/31 | 726/7 |
| 2015/0271177 A1* | 9/2015 | Mun | H04L 63/0853 | 726/7 |
| 2015/0278504 A1* | 10/2015 | Azim | G06F 21/44 | 726/3 |
| 2015/0288688 A1* | 10/2015 | Derakhshani | H04L 63/0861 | 726/19 |
| 2016/0110528 A1* | 4/2016 | Gupta | G06F 21/31 | 726/19 |
| 2016/0164865 A1* | 6/2016 | Speicher | H04L 63/0861 | 726/4 |
| 2016/0180068 A1* | 6/2016 | Das | G06F 21/31 | 726/7 |
| 2017/0061405 A1* | 3/2017 | Bryant | G06Q 20/4014 | |
| 2017/0142089 A1* | 5/2017 | Sheller | H04L 63/08 | |

* cited by examiner

METHOD FOR AUTOMATIC POSSESSION-FACTOR AUTHENTICATION

CROSS-REFERENCE TO RELATED APPLICATIONS

This application claims the benefit of U.S. Provisional Application No. 62/344,512, filed 2 Jun. 2016, which is incorporated in its entirety by this reference.

TECHNICAL FIELD

This invention relates generally to the computer security field, and more specifically to new and useful methods for automatic possession-factor authentication.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). These techniques may be used in combination (multi-factor authentication) to increase security.

In particular, possession-factor authentication utilizing smartphones (or other mobile electronic devices) has become a popular technique in multi-factor authentication systems. However, even the most sophisticated of possession-factor authentication techniques require user interaction (e.g., responding to an authentication push notification). This requirement for user interaction can be cumbersome and potentially limit applications for possession-factor based authentication.

Thus, there is a need in the digital security services field to create new and useful methods for automatic possession-factor authentication. This invention provides such new and useful methods.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
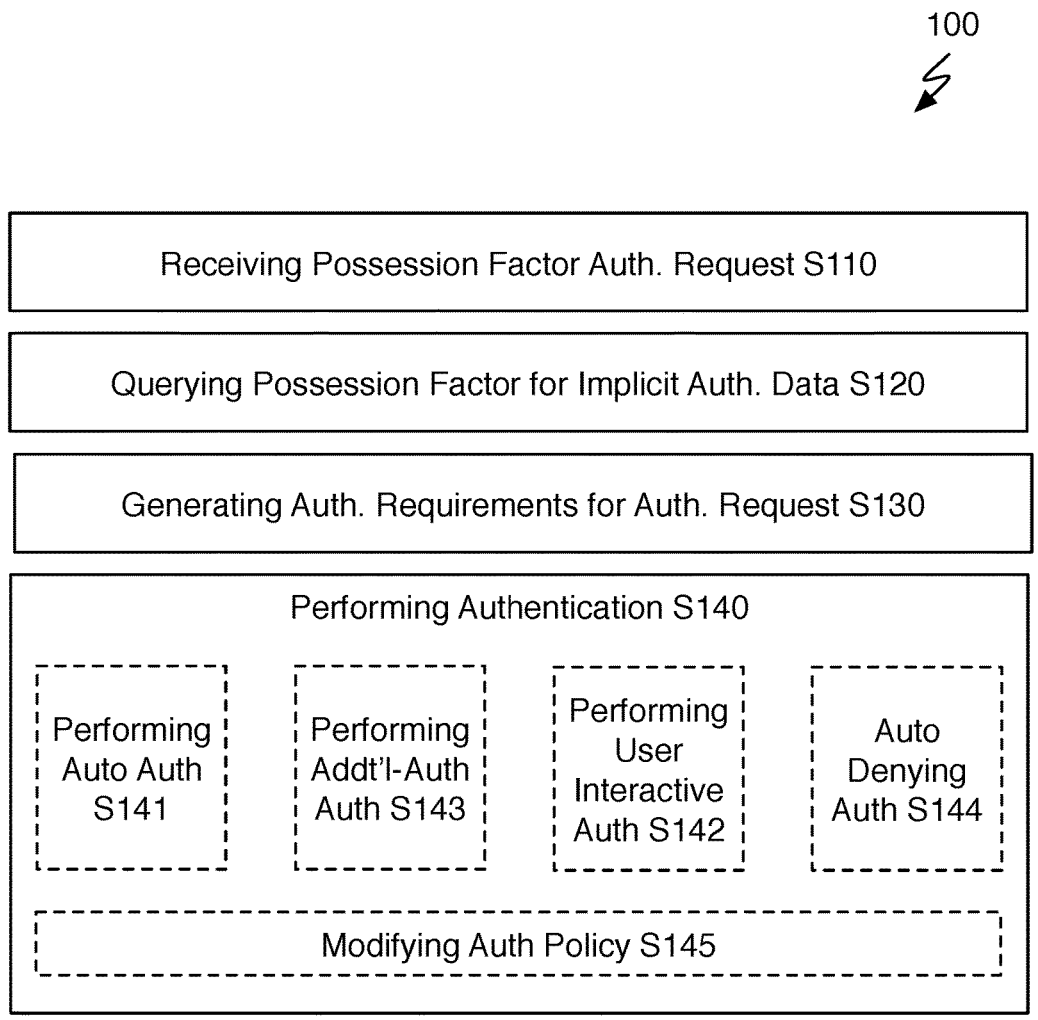
FIG. 1 is a chart view of a method of a preferred embodiment.

As shown in FIG. 1, a method 100 for automatic possession-factor authentication includes receiving a possession-factor authentication request S110, querying a possession factor for implicit authentication data S120, generating authentication requirements for the authentication request S130, and performing authentication S140.

The method 100 functions to enable automatic authentication (i.e., authentication not requiring user intervention) for possession-factor authentication by evaluating the confidence that a possession factor is possessed by an authorized user. The method 100 is preferably implemented in conjunction with a continuous or near continuous authentication algorithm operating natively on a mobile electronic device, and preferably uses data obtained, used, and/or processed by the authentication algorithm (in addition to other data) to make decisions about what level of user interaction should be required to authenticate a given transaction.

Figure 2:
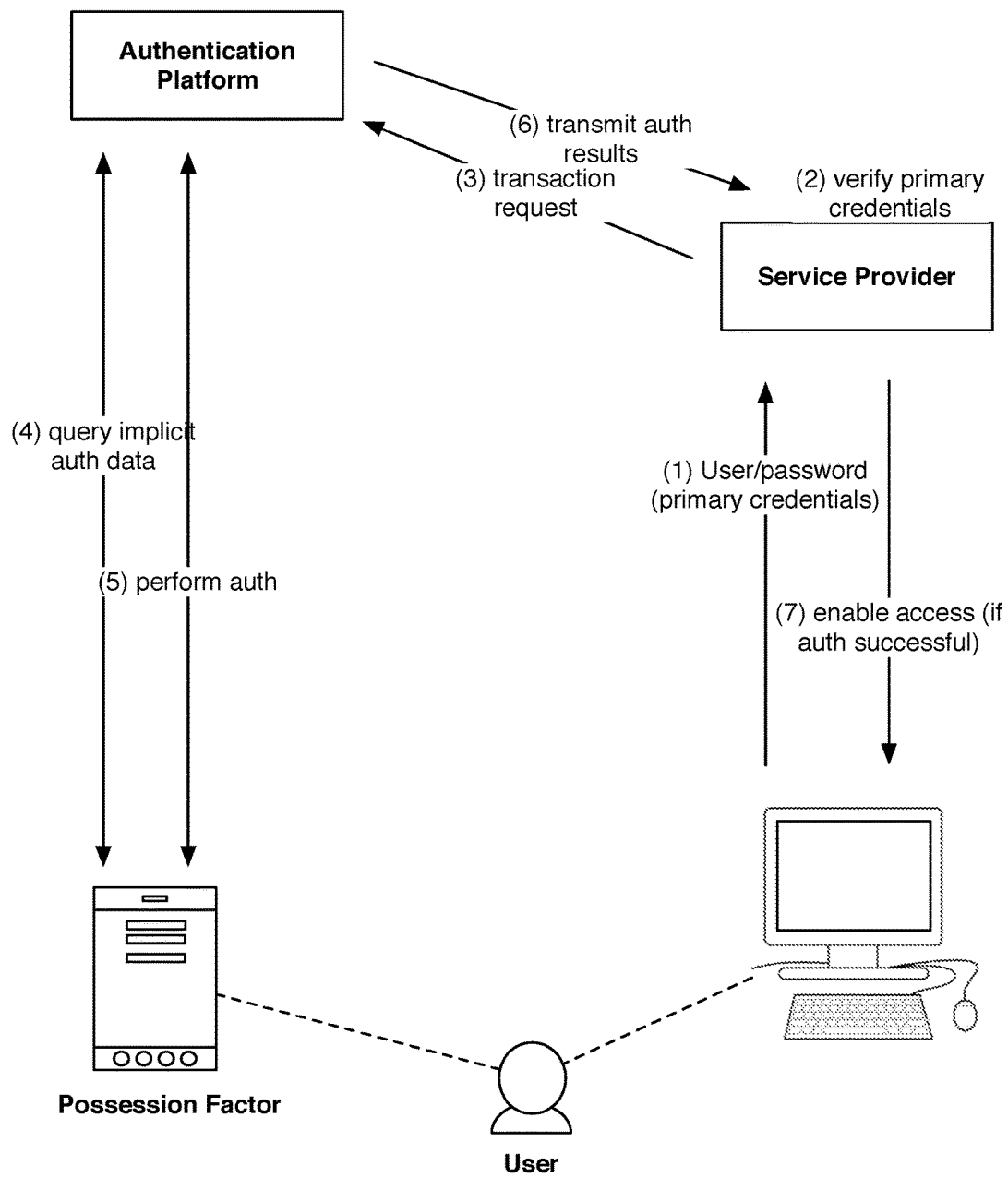
FIG. 2 is an example view of a two-factor authentication process.

The method 100 is preferably implemented as part of a multi-factor authentication process, as shown in FIG. 2, but may additionally or alternatively be implemented as part of any authentication or authorization process or system or even independent of such systems or processes. While in many multi-factor authentication processes or schemes, a user often initiates at least a first authentication process in an attempt to access some resource or perform a transaction, it is possible to implement method 100 without an explicit user-initiated authentication process (e.g., first authentication). The method 100 may be implemented, at least in part, as a passive authentication or authorization process in which the initial authentication request is made independent or without requiring a user-initiated primary authentication request. For instance, in some embodiments, method 100 may be initialized following a first passive authentication that is based on an automatic authentication that is performed based on the context or circumstances surrounding a user. In such instance, a first authentication may be performed automatically based on the user entering into a proximity of an authenticating agent (e.g., device or other element that performs automatic authentication). Thus, by entering a pre-defined geo-fenced region, a first authentication may be performed without express user intervention (e.g., without the user having to provide credentials or the like). In such example, the authenticating agent may automatically detect one or more biometric features of the user, one or more authenticating devices near or on the user's person, etc.

In another non-limiting example, a primary authentication may be performed automatically based on machine-learned user authentication behavior. For instance, an authenticating agent or the like implementing a machine learning algorithm may have obtained intelligence and learned a user's normal authentication behaviors at work or in a similar circumstance in which routine authentication is performed by the user. For instance, a user may initiate a transaction, such as entering a secured area of a building, at a specific hour on a normal basis. An authenticating agent applying a machine learning algorithm detects the user's authentication behavior and initiates primary authentication of the user based on the user entering the secured area. Full (e.g., primary authentication+secondary authentication) authentication of the user may then be performed using implicit authentication data from a possession factor.

S110 includes receiving a possession-factor authentication request. S110 functions to initiate an authentication process that utilizes a possession factor as a means for authentication. S110 may be initialized in a variety of manners including based on a passive or an express primary authentication request involving a user.

In a first implementation, S110 is triggered based on a successful completion of a primary authentication for a transaction. In this first implementation, the user may provide express authentication data (e.g., providing user credentials, expressly providing biometric data, etc.) in response to an authentication request. Once an authentication platform or service provider has verified or validated the express authentication data provided by the user, the primary authentication may be considered complete where the completion of the primary authentication (triggering event) causes the automatic initialization of S110 (triggered action). For instance, upon validation of the express authentication data, the authenticating agent may transmit an indication of a successful primary authentication to an implicit authentication agent at an auth platform or the like, which initializes an implicit authentication process involving a registered possession factor of the user.

It shall be noted that while, in some embodiments, S110 may be triggered upon the successful completion of a primary or prior authentication, as described above; additionally, or alternatively, S110 may be triggered midstream or at the beginning of a primary or prior authentication attempt. For instance, at initiation of a primary authentication, a primary authentication agent may automatically transmit an indication that a primary authentication request has started to a secondary implicit authentication agent thereby triggering S110. In another instance, at midstream (e.g., while receiving authentication credentials or data, after submission of auth credentials, at presentation of authentication prompt, or the like) of a primary authentication attempt, a primary authentication agent may automatically transmit an indication that a primary authentication request has started to a secondary implicit authentication agent thereby triggering S110. In yet other examples, a primary authentication agent may not provide an indication to an implicit authentication agent or implicit authentication platform; rather, the possession factor and/or the implicit authentication platform (or implicit authentication agent) may monitor primary authentication activities of a user or a primary authentication platform. In such example, based on identifying primary authentication activities (e.g., initialization of primary authentication or the like), S110 may be automatically triggered by the implicit authentication platform, possession factor, or the implicit authentication agent without an indication from a primary authentication agent or platform and without user intervention. It shall be noted that while many of the embodiments herein contemplate automatic initialization of S110, a user may manually initialize S110 in any suitable manner including providing an express request to an implicit authentication platform or implicit authentication agent (at the possession factor or the like). Additionally, a proximity of the possession factor to a primary authentication device, system, or platform may trigger the implementation of S110.

Possession factors used for authentication may include one or more of a mobile electronic device (including a wearable mobile electronic device), a code transmitted to a user (e.g., a one-time passcode (OTP), a code transmitted through SMS, phone call, e-mail, mail, etc.), disconnected tokens (e.g., tokens with no connection to the user device), connected tokens (e.g., tokens physically connectable to the user device, card readers, wireless tags, USB tokens, etc.), and/or any other suitable possession factor. Accordingly, a possession factor, in a security context, generally relates to user authentication credentials based on an item or device (as described above) within a possession of or accessible to a user.

The authentication request in S110 preferably requests authentication for a transaction between a user and a service provider. The transaction may be any event, transfer, action, or activity (e.g., involving a service provider) that requires authentication and/or authorization of an involved party (e.g., an authority agent). The involved party or an electronic device associated with the involved party may be the initiator of the request for authentication. Additionally, or alternatively, the service provider may be the initiator of the request for authentication. Exemplary transactions may include logging into a website, application or computer system; a user withdrawing money from an ATM; a user initiating a "forgotten password" procedure; a user attempting to enter a restricted area (or access controlled area) of a building or environment; a payment exchange between two entities; a data exchange between two entities; a user attempting to perform a restricted action in a computer system; and/or any suitable application requiring authentication and/or authorization. S110 may be performed at an authentication platform, at the possession factor itself, at a combination of the authentication platform and the possession factor, or at any other suitable location.

While throughout this specification the method 100 refers to authentication, a person of ordinary skill in the art will recognize that the techniques of the method may additionally or alternatively be applied to perform authorization. Authentication preferably includes validating the identity of at least one involved party relevant to a transaction. Authorization preferably includes validating authority or permission of an entity to execute a transaction. For authentication, the possession factor preferably belongs to the authentic user for self-approval of transactions. For authorization, the possession factor preferably belongs to an authoritative user (e.g., an authority agent) that is preferably in charge of regulating transactions of a user involved in the transaction. In some embodiments of the present application, the involved party seeking either or both of authentication and authority may be the same party. The transactions are preferably initiated in an online environment, where parties may be communicating using a computing device or public/private network, but the transactions may alternatively occur offline where parties may be interacting in the real world.

In a first implementation of a preferred embodiment, possession factor authentication is performed as secondary authentication (or tertiary authentication, etc.) or a subsequent authentication following a first successful or otherwise, previous (in time) initiated authentication process for a transaction between a user and a service provider. The previous authentication(s) and the subsequent possession factor authentication are preferably for performing a multi-factor authentication of a same transaction. In this first implementation, possession factor authentication is preferably performed after or concurrently with primary factor authentication at a service provider (e.g., sending a push authentication message to a user's smartphone after a successful username/password authentication at the service provider). If possession factor authentication is performed as one of several factors in a multi-factor authentication scheme, data concerning other authentications (i.e., authentication using another factor of the multiple factors) may be used to inform authentication via the method 100 (i.e., possession factor authentication), as described in later sections. Note that in multi-factor authentication, authentication may be managed on a per-factor level; for example, a first entity manages primary authentication (e.g., a service provider stores a 'correct' username and password combination to perform primary authentication), and a second entity manages secondary authentication (e.g., a two-factor authentication platform maintains records of possession factors and transmits the result of possession factor authentication to the service provider or an identity provider). In some embodiments of the present application, this may be significant because the aforementioned point (that data concerning other authentications may be used in determining possession factor authentication policy) is only enabled by a mechanism for transmitting this data between authenticating entities; this does not exist in traditional second-factor authentication platforms. However, this functionality does exist in the authentication platform of U.S. application Ser. No. 15/139,545 (the entirety of which is incorporated by this reference). In this authentication platform, inline frames (or other elements) in communication with the platform are integrated into the primary authentication process of a service provider (or identity provider). These iframes can enable information about primary authentication to be transmitted to the secondary authentication platform without necessarily exposing primary authentication credentials (or other details of primary authentication that may be sensitive).

Additionally or alternatively, possession factor authentication may be performed as primary authentication (either alone or with other authentication factors in a multi-factor authentication scheme). Additionally or alternatively, the primary authentication or initial authentication(s) and a possession factor authentication may be performed by a same authentication platform or authenticating entity.

The request received in S110 preferably specifies a specific user or device to be used for possession factor authentication. For example, the authentication platform may maintain descriptors of user identity that may be used to link user accounts with service providers (e.g., login information of a website) to a specific possession factor (or more generally, a user account with an authentication platform). In this example, information corresponding to these user identity descriptors may be transmitted by the service provider or other initiator to the authentication platform (when requesting authentication or at any other time). At the authentication platform, this information may be used to identify the possession factor (e.g., via a user account at the authentication platform, which may be independent of any user account maintained at the service provider). The possession factor to be used for authentication may additionally or alternatively be determined in any manner. For instance, additional information regarding specifications and specific configurations (e.g., descriptors) of the possession factor may similarly be transmitted. The descriptors of the possession factors may be used in the possession factor authentication in any manner, including for example, to ensure authentication measures or protocols can be successfully implemented or processed at the possession factor.

The request received in S110 may additionally or alternatively include any other data related to the transaction. For a two-factor authentication scenario, this may include data describing the service provider or identity provider at which primary auth. is performed, data describing the transaction (e.g., time (start time, time of day, etc.) of transaction, length of the transaction, originating IP address, originating device MAC address, operating system version, device type, geolocation), or any other suitable data (e.g., a warning from the service provider that the authentication request is in some manner suspicious). This data may be received as part of the authentication request sent from the service provider to the authentication platform (or directly to the possession factor). Additionally or alternatively, the authentication platform may collect or request this data in any manner and/or at any time during the transaction. For example, S110 may include collecting data during primary authentication (e.g., via iframe or via a plugin installed on the computer on which authentication is requested).

S120 includes querying a possession factor for implicit authentication data. S120 functions to enable the authentication process to request analysis from the possession factor that may potentially be used to indicate if the possession factor is possessed by an authorized user. Additionally, or alternatively, S120 functions to enable the authentication process to request data (e.g., unprocessed or the like) from the possession factor that may be processed and/or used at an authenticator or authentication platform to determine whether the possession factor is possessed by or otherwise, accessible to an authorized user. Additionally, or alternatively, S120 may include a periodic or continuous receipt of implicit authentication data from the possession factor without having to query the possession factor. In such instances, the possession factor may be specifically configured to transmit implicit authentication data on a predetermined schedule or based on one or more events or circumstances relating to the user.

S120 is preferably used to query a smartphone or other mobile electronic device (e.g., wearable electronic device) that possesses a mechanism (native to the operating system) that generates analysis of device sensors, device processors, device memory, generally device computing resources, and/or usage (e.g., behavioral biometrics) to determine a measure of confidence that the device is currently in possession by an authorized user.

For example, some phone operating systems may include an API for applications (e.g., a second-factor authentication app) to request a continuous authentication score from the phone.

Note that this technique is distinct from the collection of behavioral data (or other data) by the authentication platform (as described in later sections). A native continuous authentication mechanism may be more likely to be trusted (by phone developers and/or users) to access device sensors and/or application data continuously (and doing so may additionally be more efficient computationally or on battery life); accordingly, such a mechanism may have access to more data and/or more sophisticated analysis. On the other hand, such a process is not controllable by the authentication platform; accordingly, additional data may be required to perform authentication (to the standards of the authentication platform) in some situations.

Implicit authentication data may include any data that enables a determination of whether a possession factor is currently (or was recently) in possession of an authorized user (e.g., a phone owner). For example, implicit authentication data may include a determined (e.g., determined by the possession factor or auth platform) or calculated likelihood that a phone (e.g., possession factor) is possessed by an authorized user. Implicit authentication data may be based on any data (passively (e.g., received data) or actively) collectable by the possession factor (e.g., audio data, camera data, fingerprint data, accelerometer data, gyroscope data, GPS data, application usage data, WiFi data, LTE data, etc.), generated, or calculated by the possession factor (e.g., operational data of the possession factor, etc.) during a normal course of operating or using the possession factor. That is, implicit authentication data is collected or generated without the user's intervention or assisting the possession factor. While some of the implicit authentication data involves collecting data associated with user activities with the possession factor, the user activity in operating or using the possession factor, in some embodiments, should not be considered user intervention in generating or collecting the implicit authentication data. Implicit authentication data may also include data from devices communicatively coupled to the possession factor (e.g., a heart-rate monitor linked to the possession factor via Bluetooth, wearables, etc.).

Implicit authentication data may also include data that is collected and/or generated by the possession factor that is modified, in some manner (e.g., using an implicit authentication algorithm or modification process), at the possession factor (additionally or alternatively, at the auth platform) to further generate useful implicit authentication data. For instance, during a normal course of operation, the possession factor may collect biometric authentication data (e.g., fingerprint auth to access possession factor) and other authentication information (e.g., passcode login, etc.) used to access and/or utilize one or more resources of the possession factor. In such instance, prior to transmitting, providing, or using this type of implicit authentication data in an implicit authentication attempt, the possession factor may modify or apply one or more analysis or other beneficial techniques, such as a decay rate and thresholds to the implicit authentication data to provide useful insights into the value of various elements of the implicit authentication data when possibly informing a confidence level or the like. For example, the possession factor may apply a decay rate to the fingerprint authentication data, such that fingerprint authentications occurring in a more recent time has greater implicit authentication value. A similar decay rate can be applied to logins into the possession factor that use other login techniques, such as a numeric passcode. In the case that the possession factor is response to an implicit authentication data request, the possession factor may transmit both the modified and unmodified implicit authentication data.

The likelihood of possession may be determined, identified, generated, or calculated in any suitable manner by one or more of and/or a combination of the possession factor, an authentication platform, a service provider, and the like. The likelihood of possession may be represented in any manner including numerically (e.g., a scaled value, a probability value, etc.), as a relative term (e.g., high, moderate, low, etc.). In calculating a likelihood of possession, implicit authentication data preferably to recent successful authentications at the possession factor, recent biometric data of a user, geolocation of the possession factor, and the like may be factors given greater weight in the determination of the likelihood of possession relative to other implicit authentication data points, such as basic operations of the possession factor (e.g., turning on/off, making calls, etc.).

Thus, a likelihood of possession may be determined in accordance with one of a plurality of predetermined calculations or algorithms where the use of a specific predetermined calculation or algorithm may depend on the circumstances of the user that is being authenticated.

For one implementation, an example algorithm or process for determining a likelihood of possession is described in the following. As a first step, critical or determinative data types and prospective data points from implicit authentication data, which should be evaluated in a likelihood of possession are identified and can be stored in a reference table at the authentication platform and/or possession factor. These determinative data types and prospective data points define or provide indicators with respect to the possession or lack of possession of the possession factor by the user. Some example determinative data types and data points include possession factor authentication data (e.g., biometric or passcode auth to access the possession factor), biometric data specific to the user (e.g., a user's gait, video containing user's face, etc.), and the like. These data types and data points may be positive markers for calculating a positive or high likelihood of possession. Other example determinative data types and data points may include recent possession factor locks due to entry of incorrect authentications, geolocations outside of a normal realm of location of the possession factor, unhealthy endpoint analysis, indications of potential hacking of the possession factor, and the like may weigh in favor of a lack of possession thereby reducing a likelihood of possession.

In this first step, each of the determinative data types and data points maybe assigned factoring weights that allow different determinative data types and data points to be factored highly or lowly in the likelihood of possession. It shall be noted that the factoring weights for each determinative data type or data point may be determined in any suitable manner. It shall also be noted that factoring weights for data types and data points that indicate a positive possession may positively increase the likelihood of possession whereas data types and data points that indicate a negative possession may negatively decrease the likelihood of possession.

As a second step, within the implicit authentication data, the possession factor or authentication platform may search and/or parse the implicit authentication data for the pre-identified determinative data types and data points and contemporaneously (at the same time or near the same time), search for contextual data points (e.g., data points that describe circumstances surrounding a user, such as time, day, location, etc.). This step may also include seeking outliers (e.g., an unknown data type or unknown data point, a data type or a data point outside of a normal realm of data types and data points, etc.) within the implicit authentication data that may be flagged and considered separately or more intently than other implicit authentication data.

As a third step, one or more analysis techniques may be applied and/or one or more modifications may be made to the implicit authentication data. In one variation, the analysis techniques and modifications are made only to the subset of implicit authentication data that is parsed by the prior step. A purpose of this step is to acquire useful insights that may be used to inform a likelihood of possession of the possession factor. This step may use any suitable analysis techniques and/or modifications to arrive at useful insights and/or transformations of the implicit authentication data.

As a fourth step, a likelihood of possession is calculated or generated based on the implicit authentication data. In one variation, the likelihood of possession is calculated using the subset of implicit authentication data that is parsed out at the second step. In this step, a value and the assigned weights to each of the data types and/or the data points being used in the likelihood of possession calculation is determined and used to inform a value or indication of the likelihood of possession.

As an optional fifth step, the determined likelihood of possession may be compared against a possession factor continuum or a possession factor spectrum. The possession factor continuum or spectrum functions to identify a possession confidence level based on the determined likelihood of possession. In particular, the possession factor continuum or spectrum may include a plurality of possession confidence levels that indicate increasing or decreasing amount of confidence in possession as you move along the continuum or spectrum. For example, a spectrum or continuum may have four thresholds: $1^{st}$: 0%-25% likelihood, $2^{nd}$: 26%-50% likelihood, $3^{rd}$: 51%-75% likelihood, $4^{th}$: 76%-99% likelihood. In such example, the likelihood of probability may be a calculated percentage probability. The first through fourth thresholds of the spectrum or continuum may each correspond to a respective level of confidence, such as low, moderately low, medium, and high, for instance. The possession confidence levels of the spectrum or continuum may be predetermined based on historical implicit authentication data for a specific user or a group of users. In other embodiments, the possession confidence levels of the spectrum or continuum may be dynamically changed to better suit changing authentication methods, schemes, requirements, and/or circumstances of a user or group of users.

The resulting level of confidence (possession confidence level) may then directly inform the authentication requirements for implicitly authenticating the user based on possession factor authentication. For instance, if the possession level of confidence is high, then the user may be automatically authenticated based on the possession factor. If the possession confidence level is medium, a push notification may be sent to the possession factor for minimum interactive authentication by the user.

S130 includes generating authentication requirements for the authentication request. S130 functions to generate the requirements for authentication of a given transaction based on implicit authentication data (received in S120) and authentication policy (set at the authentication platform, the possession factor, etc.). S130 may additionally or alternatively utilize other data collected by the authentication platform (and/or possession factor); for example, transaction data received with the authentication request in S110, or possession factor usage data captured in addition to the implicit authentication data (both described in further detail below).

The authentication requirements generated in S130 preferably specify and/or relate to the level and/or type of authentication required to successfully complete possession factor authentication based on confidence levels that a possession factor is possessed by or reasonably (e.g., immediately accessible to or within a reach of the user) in the possession of an authorized user. Alternatively, the authentication requirements may specify level/type of authentication required (e.g., a process or action for demonstrating authority to perform the transaction and/or an identity of a party performing the transaction) for a given transaction (or for a set of transactions) in any manner including various authentication-related conditions that are considered in combination with the implicit authentication data. If a determined or calculated possession confidence is high that a possession factor is possessed by an authorized user, authentication may be performed automatically (that is, the possession factor may indicate an affirmative authentication response without any user intervention, such as a provision of additionally authentication data or information), assuming this is allowed (e.g., does not violate preset auth policy) in authentication policy. Alternatively, based on the confidence level or other authentication requirement generated based on the implicit authentication data, authentication may be performed requiring some user intervention. For instance, in some embodiment, following implicit authentication data processing, it may be required for a user to affirmatively approve an authentication request on the possession factor (e.g., by pressing a selectable 'Approve' GUI object on a phone). Alternatively, the implicit authentication data may inform a low possession confidence level. If confidence is low, a user may be requested to perform additional authentication (e.g., biometric authentication), or authentication requests may be rejected automatically without any additional requests being made to the user for authentication. The above-described are non-limiting examples of authentication types performable in S140 (and are described in more detail in sections regarding S140).

S130 preferably includes setting conditions that determine, for a given transaction, how possession factor authentication is to be performed. Setting the authentication performance conditions preferably inform the configuration of the authentication spectrum and/or the authentication continuum. For instance, each of the authentication performance conditions may specify or define thresholds for identifying portions of the authentication spectrum and/or the authentication continuum thereby indicating, within those defined portions or sections of the spectrum or continuum, which authentication types or levels is achieved and thereby, should be performed based on the implicit authentication data from the possession factor. In a non-limiting example, the likelihood (e.g., probability) that is generated using implicit authentication data from the possession factor can be compared against portions or sections of the authentication spectrum to identify an authentication type or authentication requirements for authentication.

In addition to the type of authentication specified above, S130 may additionally or alternatively specify conditions that trigger other actions (e.g., notification of potential fraud to a user, to a service provider, and/or to an authentication platform) related to authentication. For instance, in some embodiments, if the possession confidence levels are low (e.g., zero or near zero), this may also function as a condition for triggering a possible fraud alert and/or a shutdown of any future authentications attempts. Alternatively, if the possession confidence levels are high, this may also function as a condition for granting continued authentication for an authenticated session or the like. These conditions are preferably based on possession confidence levels or a likelihood of possession, but may additionally or alternatively be based on any suitable condition related to possession factor authentication.

Authentication performance conditions are preferably set based on authentication policy for the possession factor (e.g., set by an administrator of the possession factor, an administrator of a two-factor authentication platform, partially set by an authorized user of the possession factor, etc.) and implicit authentication data, but may additionally or alternatively be set based on service provider authentication policy, transaction request data, possession factor usage data (in addition of implicit authentication data), and/or analysis of any of these. In some embodiments, the authentication performance conditions may be set, changed, or modified dynamically based on one or more authentication events triggered by the implicit authentication data from the possession factor. For instance, if the possession confidence level based on the implicit authentication data is so low such that the possession confidence level indicates a lack of possession by the user and an affirmative possession by an authorized user, then the authentication performance conditions may be modified such that they are extremely heightened to ensure that no unauthorized party can perform any type of authentication with the possession factor even if the authorized party has possession of authentication data of the authorized user. For instance, the authorization performance conditions may be changed such that no implicit authentication may be performed absent an affirmative indication, via an approved channel, by the authorized user that they have regained possession of the possession factor or that the possession factor actually remains in their physical control and possession.

Possession factor authentication policy preferably includes authentication policy settings dictated by a possession factor user, possession factor administrator, authentication platform user, and/or authentication platform administrator. Possession factor authentication policy preferably specifies, for a given confidence level that a possession factor is possessed by an authorized user, the level and/or type of authentication to be performed. Additionally, or alternatively, possession factor authentication policy may specify, for a given confidence level a degree of possession (e.g., a low to high degree of possession or probability of possession) by an authorized user which may be used in identifying a level and/or type of authentication to be performed. Note that the confidence level of this paragraph is preferably calculated as part of S130 (and is preferably distinct from, though potentially based on, any confidence level supplied via S120). Possession factor authentication policy may additionally set authentication configuration based on other conditions relevant to authentication, such as those related to transaction request data and possession usage data (described in later sections). Possession factor authentication policy may additionally or alternatively set authentication configuration based on any data relevant to possession factor authentication.

Service provider authentication policy is policy similar to possession factor authentication policy, but set by an administrator of a service provider. For example, a particular service may require that automatic authentication only be performed at a certain confidence level (regardless of authentication platform settings). In some instances, service provider authentication policy may trump possession factor authentication policy; alternatively, in some embodiments, the opposite may be true. For instance, in a circumstance of potential fraud, the possession authentication policy may recognize the potential fraud where the service provider authentication may not and in those circumstances, possession factor authentication policy may override service provider authentication policy.

Service provider authentication policy may be received in any manner. For example, service provider authentication policy may be maintained in a database of an authentication platform (and automatically integrated into possession factor authentication policy). As a second example, service provider authentication policy may be specified in a transaction request (or in any other manner). As a third example, service provider authentication policy may be retrieved (or transmitted) from a database associated with the service provider.

Transaction request data preferably includes any data transmitted as part of a transaction request, such as originating service provider, originating IP address, originating service provider account, time of request, originating user, originating device, details of the transaction, etc. Transaction request data may additionally or alternatively include any data captured regarding primary authentication (e.g., via an inline frame on a service provider's website) as well as historical transaction data (e.g., the typical IP address, primary authentication device type, historical primary authentication times, historical primary authentication channel (e.g., web page, mobile device application, service provider device, etc.), and/or geolocation associated with a particular primary authentication login). In particular, transaction request data may be useful for identifying if a possession factor is physically in possession of a user requesting the transaction (e.g., the transaction request originates an IP address associated with a geolocation and the possession factor is at or near that geolocation). Thus, if the geolocation of the authorized user is known and/or can be determined, comparing the geolocation of the possession factor and the authorized user may be useful in determining a likelihood that the possession factor is in possession of the possession factor.

Possession factor usage data preferably includes any data relevant to the usage of a possession factor (e.g., application usage, operating system version, possession factor location, camera data, audio data, accelerometer data, touchscreen data, biometric usage data, etc.). Note that while some of the data included in possession factor usage data may be similar to data used by a possession factor to evaluate implicit authentication (as discussed in S120), possession factor usage data preferably refers to data captured by an authentication platform, application, or service in addition to (and preferably independent of) implicit authentication data as described in S120. Possession factor usage data may be used in possession factor authentication to inform a normal and/or typical usage of the possession factor, such that abnormal behavior and/or abnormal usage of the possession factor may be detected and/or incorporated as a factor during possession factor authentication using implicit authentication data. Similarly, normal and/or typical usage of the possession factor may be detected and/or incorporated as a factor during possession factor authentication.

In a first implementation of a preferred embodiment, S130 includes calculating a possession confidence score based on both of implicit authentication data received from a native operating system API of a mobile electronic device and an analysis of transaction request data. Additionally, or alternatively, the implicit authentication data may be received from an application specifically or generally intended for obtaining and/or generating implicit authentication data that interacts with the native operating system of a possession factor that may be a mobile device. In this first implementation, the authentication requirements for a transaction are determined by evaluating this possession confidence score against a possession factor policy that specifies authentication requirements based on the confidence score (e.g., confidence score 0-75=require user authorization, confidence score 76-100=perform authentication automatically). The possession factor policy preferably includes one or more policies that inform and/or define a possession factor continuum or a possession factor spectrum. The possession factor policy may define thresholds or implicit authentication satisfaction requirements. In this way, the authentication requirements may be determined according to where along the possession factor continuum or spectrum the calculated possession confidence score falls within. With respect to authentication satisfaction requirements of the possession factor policy, these may typically relate to one or more or a plurality of data elements that if found or if available in the implicit authentication data may assist in the confidence score calculate or separately, directly correlate to a specific authentication requirement (e.g., geolocation of possession factor is same as geolocation of user=perform authentication automatically without user intervention).

S130 preferably includes calculating possession confidence based on a manually-specified algorithm that creates a possession confidence score from implicit authorization data and at least one of transaction request data and possession factor usage data. The manually-specified algorithm may be able to take into account dynamic changes in authentication patterns of users to form a better possession confidence score calculation scheme that an otherwise, predetermined algorithm may miss. For instance, it may be detected that a user has moved from a first permanent address to a second permanent address. In this regard, the geolocation of the possession factor may also change to match the second permanent address, however, one type of predetermined possession confidence algorithm may only recognize that the possession factor during an authentication attempt is not found at a normal or typical authentication location therefore, possibly triggering a fraud alert or heightened authentication requirements. A manually-specified algorithm, however, may be able to consider a user's profile or other information that may reveal the change in permanent address and allow the confidence score calculation to recognize that the possession factor may provide implicit authentication data which includes the second permanent address thereby eliminating false positives in fraud alerts and/or inaccurate possession confidence score calculations. Additionally, or alternatively, S130 may include calculating possession confidence in any manner. For example, S130 may include calculating possession confidence using a machine learning algorithm that trains possession confidence estimation based on usage (and transactions performed) during a training period.

If S130 includes using an algorithm that requires training, S130 may additionally or alternatively include setting authentication requirements based on algorithm training progress (e.g., if the algorithm has insufficient data to produce accurate possession confidence scores due to inadequate training, automatic authentication may be disabled until the algorithm has been further trained or alternatively, a portion of the machine learning algorithm may revert or rely on an existing possession confidence score calculation algorithm, as described above).

S130 may include generating possession confidence analysis or scores using one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality of learning styles can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. However, any suitable machine learning approach can otherwise be incorporated in the method 100 without significantly departing from the inventive concepts of the present inventions and embodiments disclosed herein. Further, any suitable model (e.g., machine learning, non-machine learning, etc.) can be used in generating possession confidence scores and/or other data relevant to the method 100.

S140 includes performing authentication. S140 functions to, based on the authentication requirements generated in S130, authenticate (or attempt to authenticate) a transaction in response to the possession factor authentication request. For instance, S140 may include identifying the authentication requirements based on the possession confidence score determination and other processes of S130 and implementing the authentication requirements in an attempt to authenticate a current or pending transaction requiring authentication.

As mentioned above, S140 includes identifying the authentication requirements and may include one or more of performing automatic authentication S141, performing user-interactive authentication S142, performing additional-auth authentication S143, and automatically denying authentication S144. S140 may additionally or alternatively include modifying authentication policy S145. Additionally, or alternatively, S140 may include generating one or more authentication-based alerts other than or in addition to performing the authentication requirement S146.

S141 includes performing automatic authentication of the transaction and/or the user that possibly initiated a primary authentication. In traditional possession factor authentication systems, users desiring authentication generally interact with a possession factor in some manner to demonstrate possession (e.g., approving a push notification on a possession factor, entering a one-time password (OTP) displayed on a possession factor, answering a call or text message to the possession factor, etc.). These traditional possession factor authentication schemes are usually preset irrespective of implicit authentication data available at the possession factor. By evaluating implicit authentication data (along with transaction request data and/or possession factor usage data) in light of authentication policy (in S130), situations in which there is high confidence that a user is in possession of a possession factor can be leveraged to perform authentication without any user interactions whatsoever. This, of course, may assist in streamlining multi-factor authentication processes that, in some embodiments, can be cumbersome; particularly, in circumstances when the authentication at the possession factor requires additional knowledge by the user to successfully perform a secondary or subsequent authentication at the possession factor. Additionally, evaluating implicit authentication data in light of authentication policy allows for a dynamic approach to setting authentication requirements with respect to the use of possession factor for authentication, and more specifically, for a secondary or additional authentication. The dynamic authentication requirements setting may be useful to digest contextual data surrounding a user's attempt to authenticate a transaction.

As an example, a particular user may walk with a particular gait. If the possession factor (e.g., mobile phone) is typically on the user's person, the possession factor may capture and/or record data relating to the user's particular gait. Accordingly, when the request for possession factor authentication is sent to an authentication platform or service provider, it may be recognized (e.g., via the implicit authentication score queried in S120) that accelerometer data indicates that it is highly likely that the possession factor (in this case, a smartphone) is in the user's pocket. In this example, the implicit authentication data would have provided insight to, at least, two authentication data points that may be very useful in authenticating a user or transaction. Specifically, the first authentication data point relates to a specific location (e.g., possession factor geolocation) of the possession factor relative to the user and the second data point relates to a factor (e.g., user's gait data) that is specifically tied to a biometric of the user that is highly difficult to falsify therefore, possibly being tantamount to a fingerprint of the user. Further, the request is analyzed in S130 using historical transaction request data or the like and matches a commonly approved request (and originates from a known IP address). In examples such as these, (or in other situations in which there is high confidence that a possession factor is possessed by an authorized user and that the original transaction request originated from said user), the implicit authentication data stemming from the possession factor may automatically provide a basis for authentication approval without any user intervention at the possession factor or otherwise.

Note that S141 may be performed in whole or in part by either of the possession factor or an authentication platform. For instance, the evaluation of implicit authentication data (and generation of a confidence score) may take place locally on the possession factor and/or may be transmitted to a remote authentication platform for evaluation. In the instance that automatic authentication is performed locally at the possession factor, the possession factor may transmit to the service provider or other party requiring authentication the results of the authentication at the possession factor. The transmission of the automatic authentication result may also include the basis and/or implicit authentication data for performing authentication.

S142 includes performing user-interactive authentication. S142 is preferably performed in situations where confidence in possession by a user is not high enough (for a given level of authentication security/policy) to automatically authenticate a transaction, but not low enough to require additional authentication (beyond user approval at the possession factor) or to deny authentication. That is, S142 is preferably includes implementing a minimal user-interactive authentication that, in many embodiments, does not require additional authentication knowledge by the user but rather, a simple or less complex authentication actions (e.g., a press of a user interface button or a binary selection of 'Yes' or 'No', 'Approve' or 'Disapprove,' etc.). In this way, the authentication load is very light on the user but not as light as an automatic authentication.

Figure 3:
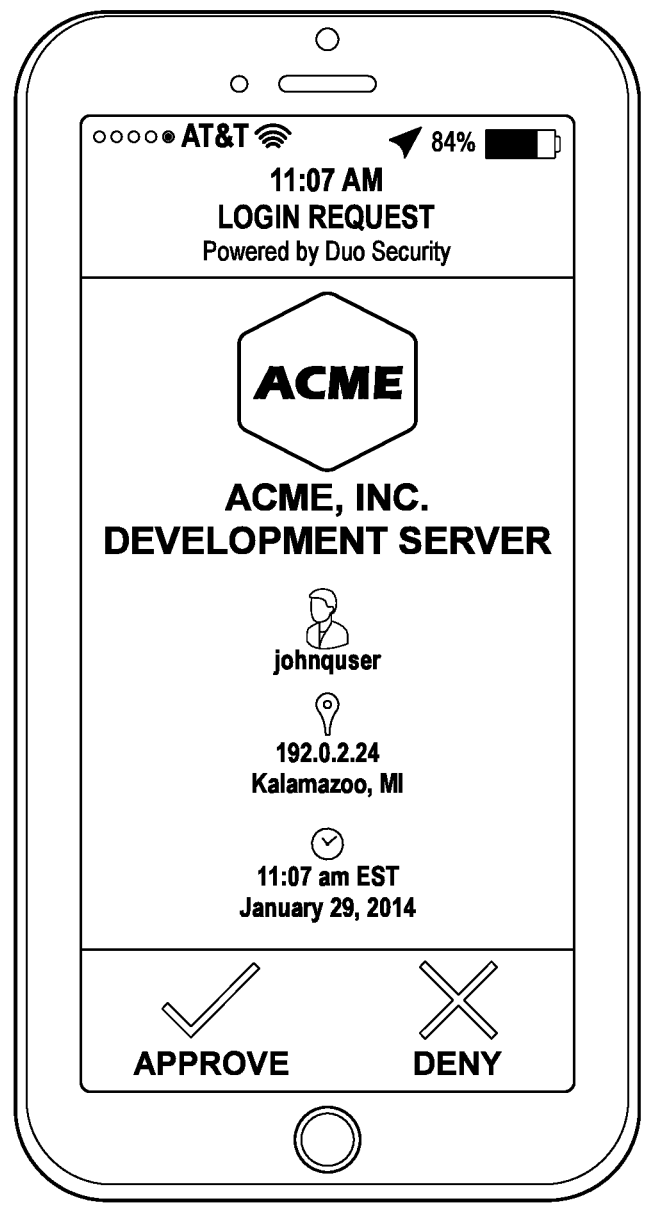
FIG. 3 is an example interface of a push notification for possession factor authentication.

S142 preferably includes performing user-interactive authentication by sending a push notification to the possession factor, as shown in FIG. 3 and as described in U.S. patent application Ser. No. 15/146,223, the entirety of which is incorporated by this reference. Additionally, or alternatively, S142 may perform user-interactive authentication in any manner (e.g., by sending a one-time passcode to the possession factor via SMS). As mentioned above, the push notification to the user may include a binary prompt that allows the user to select among two options, such as 'Yes' or 'No'. The push notification to the possession factor may include additional options for providing an authentication response by the user including an option to report the subject transaction as potential fraud or the like.

User-interactive authentication preferably includes any authentication that requires user interaction with a possession factor, but may not require additional explicit authentication of the user (as opposed to S143). Note that in some cases, additional implicit authentication of the user may be required (e.g., if a phone has a passcode, that passcode may need to be entered to unlock the phone before responding to a push notification and the data (other than the passcode, itself) associated with the entry of the passcode (e.g., data indicating a successful entry or unsuccessful entries) for unlocking the phone may be transmitted as implicit authentication data; or, if a key token is locked in a safe, a user may need to first open the safe to read the key token and similarly, data associated with a successful access and/or unsuccessful attempts to access the safe may be transmitted as implicit authentication data) to perform authentication, but this may not be required by the authentication process (as opposed to the additional authentication required in S143) unless other data elements within the initial implicit authentication data transmission provide an indication that data regarding possession factor access may be required.

As described in incorporated references, user-interactive authentication preferably enables users to approve or deny transaction requests. Additionally or alternatively, user-interactive authentication may allow users to report potential fraud (or otherwise report suspicious transaction requests).

Figure 4:
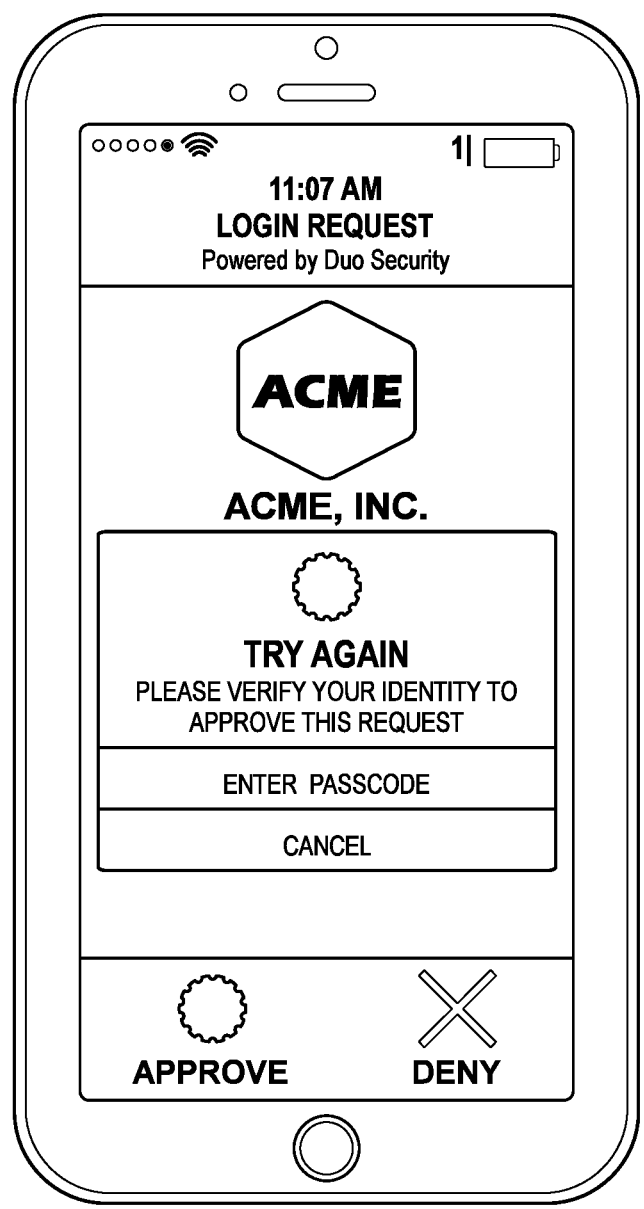
FIG. 4 is an example interface of a push notification for possession factor authentication requiring biometric authentication.

S143 includes performing additional-auth authentication, as shown in FIG. 4 and as described in U.S. patent application Ser. No. 15/146,223. Additional-auth authentication is preferably performed in situations where confidence that the possessor of a possession factor is an authorized user is low or moderate to low. Additionally, or alternatively, S143 may be performed when a possession confidence level or score cannot be determined due to conflicting implicit authentication data where both positive and potentially negative data exist in the implicit authentication dataset. Even if native security measures (as described in previous paragraphs) are present, they may not be sufficient to ensure that the person who approves a transaction or who requests a transaction is an authorized user of the possession factor; for example, many smartphones enable responding to notifications without requiring unlocking credentials to be re-entered if the smartphone has not been locked (either manually or automatically, e.g., due to inactivity) since the most recent unlocking event. Thus, in such circumstances, the implicit authentication data may be sufficient to generate a sufficiently high confident score that an authorized user is in possession of the possession factor, but various data points in the implicit authentication data may indicate that it has been a prolonged period of time since the user has entered in credentials or a passcode for unlocking the possession factor, such as a smartphone or the like. For instance, the user may be using or has provided access to the possession factor to another person to perform another activity such as watching a video or a movie, which prevents the smartphone from locking and thereby, requesting credentials to unlock.

S143 preferably includes collecting agent verification data (i.e., data to verify that a user is an authority agent of the possession factor) and analyzing it to determine if said agent verification data corresponds to an authorized user. Agent verification data may include any data capable of verifying a user as an authorized user of a possession factor (or of an authentication application, etc.). Agent verification data may include knowledge data (e.g., a numerical passcode known to an authorized user of the authority device, pattern/drawing passcode, etc.), biometric data (e.g., fingerprint data of a finger of an authorized user of the authority device, characteristic speech frequency of an authorized user of the authority device), or any other suitable data. For instance, agent verification data may be the same authentication information required for accessing or unlocking the possession factor (e.g., passcode or pin for unlocking smartphone display). Alternatively, the agent verification data may be independent and distinct from the verification data used for accessing or unlocking the possession factor.

S143 may be performed in whole or in part by either of the possession factor or an authentication platform. For instance, the evaluation of agent verification data may take place locally on a smartphone (possession factor). In the instance that evaluation of agent verification data is performed locally at the possession factor, the possession factor may transmit to the service provider or other party requiring authentication the results of the evaluation at the possession factor. The transmission of the evaluation of the agent verification data and associated result may also include the basis and/or implicit authentication data for performing the evaluation.

S144 includes automatically denying authentication. S144 is preferably performed in situations where confidence in possession is very low (or there is high confidence that a possession factor is possessed by an unauthorized user, or that a transaction is fraudulent). In any of these situations, S144 may automatically reject an authentication request without requiring user intervention (or even prompting for user intervention).

In addition to denying authentication, S144 may include reporting (S146) transaction requests as potentially suspicious or fraudulent (e.g., to users, to administrators, to service providers, etc.). The reporting may include details of the attempted transaction together with any necessary information for identifying a location and/or unauthorized user of the possession factor.

S144 may be performed in whole or in part by either of the possession factor or an authentication platform. For instance, determination that a transaction request is suspicious may occur at an authentication platform.

S145 includes modifying authentication policy. S145 functions to modify authentication policy in response to possession factor confidence levels (or any of the other authentication concerns described in the system 100). For example, if a transaction is detected as potentially fraudulent, S145 may include requiring additional (or otherwise heightened) authentication requirements for transactions involving the same user (and/or the same service provider, the same possession factor, etc.). For example, a fraudulent user may attempt to authenticate via push and is thwarted (e.g., via S143 or S144). This user may re-attempt to authenticate, this time using an OTP; however, in between attempts, S145 may modify authentication policy to prevent any authentication (including OTP) from occurring without additional authentication as described in S143 (e.g., biometric authentication). Additionally, or alternatively, the authentication policy for the specific user may be modified to require the user to acquire a new possession factor and possibly, register the same, especially if the user's current possession factor has been compromised or may be easily compromised (e.g., easily hacked smartphone or device).

S145 may additionally or alternatively include modifying any aspect (temporarily or permanently) of authentication as performed via the method 100 in any manner in response to analysis of transaction data, possession factor usage data, implicit authorization data, or any other relevant data. For example, implicit authorization data and/or other data may be used to determine if a particular method of authentication (e.g., OTP) is acceptable (regardless of whether authentication had been previously attempted).

In addition to performing authentication, S140 may additionally include communicating the results of authentication and/or policy modification (and other relevant data) to any relevant party (e.g., a service provider).

A system for automatic possession-factor authentication includes a service provider, an authentication platform, a possession factor, and a primary authentication system.

The system is configured to perform authentication using implicit authentication data provided by a possession factor. The possession factor may include one of a smartphone, a mobile electronic device, or any suitable device having capabilities to parse implicit authentication data for use in the implicit authentication for a transaction involving a user and the service provider. The authentication platform may include a computing server or a distributed computer system of an authentication service or the like. In one variation, the authentication platform is associated with the service provider and/or forms part of a service provider's systems.

The authentication platform (or the possession factor) is configured to receive an implicit authentication request for initiating the authentication for the transaction based on the possession factor that is associated with the user. The request may be transmitted by the service provider or the possession factor. The authentication platform may then transmit a query to the possession factor requesting implicit authentication data where the implicit authentication data comprising data collected or generated by the possession factor without user intervention and that enables authentication for the transaction. In response to transmitting the query, the authentication platform may receive implicit authentication data from the possession factor and consequently, generate authentication requirements using the implicit authentication data, wherein the authentication requirements define a process or an action for authentication for the transaction, and wherein generating the authentication requirements includes selecting one of a plurality of different, predefined authentication requirements. The selection of one of the different and predefined authentication requirements may be dictated or informed by the implicit authentication data. Once the authentication requirements are identified, the authentication for the transaction may be performed in accordance with the authentication requirements.

The method and parts of the system of the preferred embodiments and variations thereof can be embodied and/or implemented at least in part as a machine configured to receive a computer-readable medium storing computer-readable instructions. The instructions are preferably executed by computer-executable components preferably integrated with an authentication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for performing authentication using implicit authentication data provided by a possession factor, the system comprising:

a possession factor comprising one of a smartphone or a mobile electronic device having a capability to parse implicit authentication data for use in the implicit authentication for a transaction involving a user and a service provider;

an authentication platform comprising a remote Internet server, wherein at the authentication platform:

receiving, via a communication network, an implicit authentication request for initiating the authentication for the transaction based on the possession factor that is associated with the user;

transmitting, via the communication network, to the possession factor a query to the possession factor requesting implicit authentication data, the implicit authentication data comprising data collected or generated by the possession factor without user intervention and that enables authentication for the transaction;

in response to transmitting the query, receiving, via the communication network, from the possession factor implicit authentication data from the possession factor;

generating a possession confidence level using the implicit authentication data, the possession confidence level being one of a plurality of possession confidence levels, the possession confidence level indicating a likelihood that the possession factor is possessed by the authorized user;

generating authentication requirements based on the possession confidence level, wherein the authentication requirements define a process or an action for performing authentication for the transaction, wherein generating the authentication requirements includes:

(i) selecting a first of a plurality of different, predefined authentication requirements when the possession confidence level satisfies a first confidence threshold, or (ii) selecting a second of the plurality of different, predefined authentication requirements when the possession confidence level satisfies a second confidence threshold; and performing authentication for the transaction in accordance with the selected predefined authentication requirements.

2. The system of claim 1, wherein further at the authentication platform:

wherein receiving the implicit authentication request is triggered by a transmission indicating a successful primary authentication for the transaction, wherein the primary authentication is:

(i) performed independent of the authentication using the implicit authentication data and (ii) performed by the service provider, the service provider being independent of the authentication platform.

3. The system of claim 1, wherein further at the authentication platform:

wherein receiving the implicit authentication request is initialized by a transmission provided midstream of a primary authentication, the transmission indicating that a primary authentication is being performed for authenticating the transaction wherein the primary authentication is:

(i) performed independent of the authentication using the implicit authentication data and (ii) performed by the service provider, the service provider being independent of the authentication platform.

4. The system of claim 1, wherein further at the authentication platform:

generating a likelihood of possession of the possession factor by the user, wherein the likelihood of possession comprises a probability value indicating a probability that the possession factor is possessed by the user, wherein the generating the likelihood of possession includes:

(i) parsing determinative data indicating a potential possession or indicating a potential lack of possession of the possession factor by the user from the implicit authentication data thereby generating a subset of the implicit authentication data, (ii) applying one or more analysis techniques or transformation techniques to the subset of implicit authentication data to determine possession insights relating to a possession or lack of possession of the possession factor, and (iii) calculating a value for the likelihood of possession using the implicit authentication data and the possession insights.

5. A method for performing implicit authentication for a transaction based on a possession factor, the method comprising:

receiving, via a remote Internet server, a transaction request;

responsive to receiving the transaction request, accessing implicit authentication data from a possession factor associated with an authorized user, the implicit authentication data comprising data that is captured automatically by the possession factor and relating to one or more of an operation of one or more sensors of the possession factor and a usage of the possession factor, at the possession factor or at an authentication platform, wherein the possession factor comprises a mobile computing device, and wherein the authentication platform comprises a remote computing server:

generating a possession confidence level using the implicit authentication data, the possession confidence level being one of a plurality of possession confidence levels, the possession confidence level indicating a likelihood that the possession factor is possessed by the authorized user;

identifying, among a plurality of varying authentication requirements, an authentication requirement for the transaction based on the possession confidence level, the authentication requirement defines a process or action to prove authority to perform the transaction or a process or action to prove an identity of a user attempting to perform the transaction, wherein identifying the authentication requirement for the transaction includes:

(i) selecting a first of a plurality of different, predefined authentication requirements when the possession confidence level satisfies a first confidence threshold, or (ii) selecting a second of the plurality of different, predefined authentication requirements when the possession confidence level satisfies a second confidence threshold; and
implementing the selected predefined authentication requirements for the transaction.

6. The method of claim 5, further comprising:
receiving a possession-factor authentication request, the receipt of the possession-factor authentication request triggering an initialization of the implicit authentication based on the possession factor.

7. The method of claim 6, wherein the possession-factor authentication request comprises an indication that a primary authentication separate from the implicit authentication was performed successfully or is being performed on a basis of authentication data provided expressly by a party.

8. The method of claim 6, wherein the possession factor comprises a query able to be submitted to the possession factor, wherein the query comprises a request for implicit authentication data from the possession factor.

9. The method of claim 5, further comprising:
querying the possession factor for the implicit authentication data and analysis of the implicit authentication data, wherein the analysis provides one or more indications to determine if the possession factor is possessed by the authorized user.

10. The method of claim 9, wherein the possession factor comprises a smartphone or a mobile electronic device that includes a mechanism native to an operating system thereof that generates the analysis of the implicit authentication data captured or generated one or more of device sensors and computing resources of the smartphone or the mobile electronic device.

11. The method of claim 5, further comprising:
identifying or selecting a decay rate to apply to a data subset of the implicit authentication data, wherein the decay rate reduces a value of the data subset prior to the generation of the possession confidence level; and
applying the decay rate to the data subset, wherein the generation of the possession confidence level is based at least on the data subset having the applied decay rate.

12. The method of claim 5, wherein the implicit authentication data comprises biometric data, wherein the biometric data comprises:
(1) an analysis of or data related to a gait of a user having, at some historical time, possession of the possession factor, or
(2) an analysis of or data related to a fingerprint of a user, wherein the analysis of or the data related to the fingerprint was generated or collected in a historical authentication event that is separate from the implicit authentication.

13. The method of claim 5, wherein identifying the authentication requirements is further based on predetermined possession factor authentication policy set at the possession factor or at the authentication platform, wherein the predetermined possession factor authentication policy defines the plurality of authentication requirements permissible via implicit authentication and dictates one or more conditions for performing each of the plurality of authentication requirements.

14. The method of claim 5, wherein generating the possession confidence level comprises generating a possession confidence score using implicit authentication data and transaction request data, wherein the transaction request data comprises data exchanged as part of a transaction request initiating the transaction, and wherein the data exchanged comprises one or more of an originating service provider, an originating IP address of the transaction request, a time of the transaction request, and details of a primary authentication for the transaction.

15. The method of claim 5, wherein the identified authentication requirement comprises one of:
(1) performing automatic authentication of the transaction without intervention at the possession factor by the authorized user,
(2) performing user-interactive authentication based on transmitting a push notification to the possession factor, wherein the user-interactive authentication comprises a binary prompt for approval or denial of the transaction by the authorized user,
(3) performing additional authentication to verify the identity or the authorization of the user attempting to perform the transaction, and
(4) automatically denying authentication of the transaction.

16. The method of claim 5, wherein further at the possession factor or the authentication platform:
generating a likelihood of possession of the possession factor by the user, wherein the likelihood of possession comprises a probability value indicating a probability that the possession factor is possessed by the user,
wherein generating the possession confidence level includes:
(i) comparing the probability value of the likelihood of possession to a possession factor continuum, the possession factor continuum being defined by the plurality of possession confidence levels provided in an increasing manner or a decreasing manner along the possession factor continuum, and
(ii) determining the possession confidence level based on the comparison.

17. The method of claim 5, wherein:
(i) wherein implementing the selected authentication requirement includes performing the first authentication by performing the authentication for the transaction automatically without intervention by the authorized user,
or
(ii) wherein implementing the selected authentication requirement includes performing the second authentication by automatically denying authentication based on the possession factor or performing additional authentication requiring user-intervention via the possession factor.

18. A method for executing authentication for a transaction between an authorized user and a service provider, the method comprising:
in response to receiving, at the service provider, primary authentication data associated with a primary authentication for the transaction, initializing a secondary authentication for the transaction using implicit authentication data from a possession factor associated with the authorized user, wherein initializing the secondary transaction includes transmitting a transaction request associated with the transaction, via a network, to a remote secondary authentication computing server, wherein the implicit authentication data comprises data that enables a determination of whether the possession factor is currently or near currently in possession of the authorized user, wherein the implicit authentication data is collected by the possession factor during a normal course of operation of the possession factor without user assistance in the collection;

generating a likelihood of possession based on the implicit authentication data;

identifying an authentication action or an authentication process for implementing the secondary authentication using the likelihood of possession to inform a selection of the authentication action or the authentication process from among a plurality of authentication actions or a plurality of authentication processes, wherein identifying the authentication action or the authentication process for implementing the secondary authentication includes:

(i) selecting a first of a plurality of different, predefined authentication actions or predefined authentication processes when the likelihood of possession satisfies a first possession threshold, or (ii) selecting a second of the plurality of different, predefined authentication actions or predefined authentication processes when the likelihood of possession satisfies a second possession threshold; and performing the secondary authentication in accordance with the selected predefined authentication action or the selected predefined authentication process.

19. The method of claim 18, wherein the likelihood of possession corresponds to one of the plurality of authentication actions or one of the plurality of authentication processes.

20. The method of claim 18, wherein the primary authentication includes receiving explicit authentication response data from the authorized user, and wherein the secondary authentication includes receiving authentication response data only if the implicit authentication data informs a requirement for a non-automatic authentication.

\* \* \* \* \*